United States Patent [19]

Kasai et al.

[11] 4,283,978
[45] Aug. 18, 1981

[54] NOTCHING MACHINE

[75] Inventors: Shigeo Kasai, Sagamihara; Toshiaki Nishiyama, Fujisawa; Kiju Kawada, Atsugi, all of Japan

[73] Assignee: Amada Company Ltd., Kanagawa, Japan

[21] Appl. No.: 38,006

[22] Filed: May 10, 1979

[30] Foreign Application Priority Data

May 10, 1978 [JP] Japan .................. 53-61484[U]

[51] Int. Cl.³ .................. B26D 3/14; B26D 7/26
[52] U.S. Cl. .................. 83/620; 83/693; 83/917
[58] Field of Search .......... 83/917, 618, 620, 622, 83/692, 693

[56] References Cited

U.S. PATENT DOCUMENTS

| 1,447,247 | 3/1923 | Hilsdorf | 83/618 X |
| 3,215,017 | 2/1965 | Rutz | 83/917 X |
| 3,592,093 | 7/1971 | Cantrelli | 83/364 |
| 3,616,719 | 11/1971 | Tassie | 83/620 |
| 3,850,067 | 11/1974 | Davey | 83/917 |
| 3,938,413 | 2/1976 | Goettel et al. | 83/622 X |

*Primary Examiner*—Donald R. Schran
*Attorney, Agent, or Firm*—Wigman & Cohen

[57] ABSTRACT

The present invention relates to a notching machine which comprises a frame, a table mounted on the frame, a device for holding shearing tools on the table, a ram member vertically movably mounted on the frame, an upper shearing tool provided with the ram member, and a lower shearing tool cooperating with the upper shearing tool. The lower shearing tool is divided into a plurality of pieces. The notching machine also comprises a screw arrangement for adjustably holding the lower shearing tool in the device for holding the shearing tools. The adjustable holding of the lower shearing tool is done in such a manner that the horizontal clearance between the upper and lower shearing tools may be changed in lateral, forward and backward directions independently.

1 Claim, 8 Drawing Figures

NOTCHING MACHINE

BACKGROUND OF THE INVENTION

1. Field of the Invention

The present invention relates generally to a metal processing machine for shearing sheet materials such as sheet metals and more particularly to a notching machine which is a kind of presses for shearing sheet materials to form notches of various shapes on sheet materials.

2. Description of the Prior Art

In many industries, there exists a requirement to form notches of various shapes such as V-shaped configurations at corners and edges of sheet materials such as sheet metals.

Heretofore, it has been usual that notches are formed on sheet materials by presses with use of specially designed shearing tools. Also, there have been shearing presses often referred to as notching machines which have upper and lower shearing tools and are specially designed to form either corner notches or edge notches on sheet materials.

It has been of course desired to form both corner notches and edge notches of various shapes on sheet materials with use of a single notching machine. Also, in order to form notches of various shapes on sheet materials of a variety of thicknesses, it is necessary to adjust the clearance between the upper and lower shearing tools in notching machines according to thickness of sheet materials to be notched.

Heretofore, there has been no notching machines that can form both corner notches and edge notches on sheet materials and are so designed that the clearance between the upper and lower tools can be adjusted according to thickness of sheet materials to be notched. Therefore, in conventional notching machines, shapes of notches that can be made on sheet metals have been limited, or otherwise it has been necessary to often change the upper and lower shearing tools according to thickness of sheet materials to be notched. Accordingly, heretofore, many notching machines and notching tools have been required to form a variety of notches of various shapes on sheet materials of various thicknesses, and therefore much cost has been required.

SUMMARY OF THE INVENTION

It is an object of the present invention to provide a versatile notching machine which can form a variety of notches of various shapes on a wide range of sheet materials of various thicknesses.

It is therefore an object of the present invention to provide a notching machine which can form both corner notches and edge notches of various shapes on sheet materials of various thicknesses.

It is also an object of the present invention to provide a notching machine in which the clearance between the upper and lower shearing tools can be easily adjusted according to thicknesses of sheet materials to be notched.

Accordingly, it is a further object of the present invention to provide an economical notching machine.

In order to accomplish these objects, the notching machine according to the present invention is provided with two pairs of upper and lower shearing tools in such a manner that the clearances between the upper and lower shearing tools can be adjusted.

Other and further objects and advantages of the present invention will be apparent from the following description and accompanying drawings which, by way of illustration, show preferred embodiments of the present invention.

DESCRIPTION OF THE PREFERRED EMBODIMENT

Figure 1:
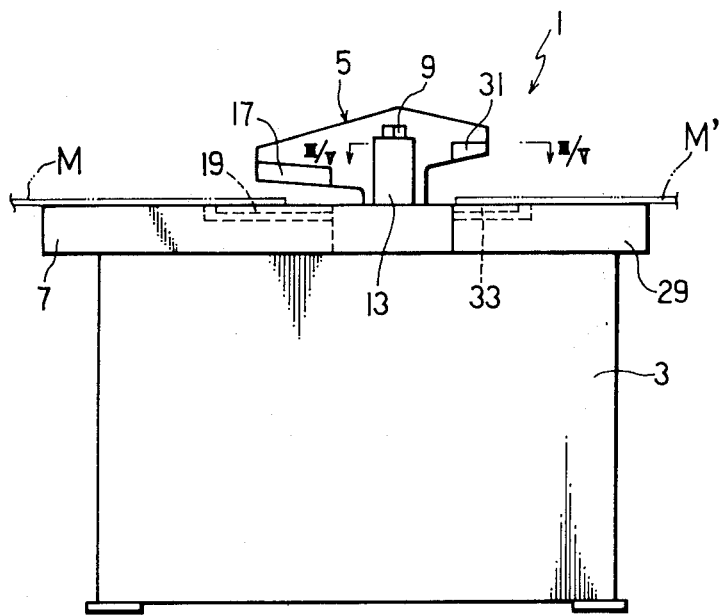
FIG. 1 is a side elevational view of a notching machine embodying the principle of the present invention.
Figure 2:
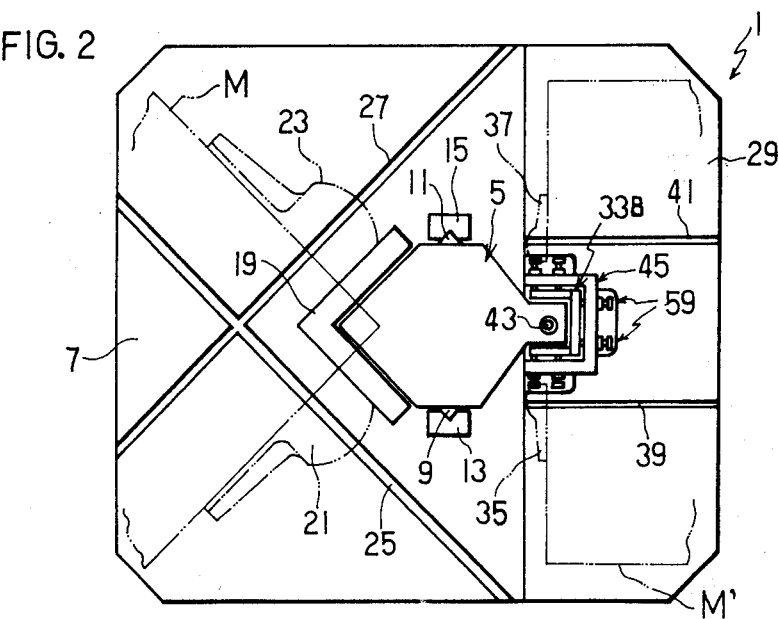
FIG. 2 is a plan view of the notching machine shown in FIG. 1.

Referring now to FIGS. 1 and 2, there is shown a notching machine 1 which comprises a more or less box-like frame 3 and a ram member 5 vertically movably mounted at the substantially central portion of the frame 3. As is more or less conventional, the notching machine 1 is provided with a front work-table 7 which is horizontally fixedly mounted on the front portion of the frame 3 so that a sheet material M to be notched may be placed thereon. The ram member 5 of the notching machine 1 has at its sides a pair of vertical slide members 9 and 11 engaging with a pair of guide members 13 and 15 which are vertically moved on the frame 3, and it is so disposed as to be vertically moved by a drive means (not shown) toward and away from the front work-table 7 along the guide members 13 and 15.

In order to notch the sheet material M which is placed on the front work-table 7, the ram member 5 is provided on its front side with an upper shearing tool 17 facing downwardly, and a lower shearing tool 19 is fixedly but detachably mounted on the front work-table 7 just beneath the upper shearing tool 17 to cooperate therewith. In the preferred embodiment, the upper and lower shearing tools 17 and 19 have been formed V-shaped in configuration so that they may form V-shaped notches on the sheet material M to be placed on the front work-table 7. More particularly, the upper and lower shearing tools 17 and 19 are shown in FIG. 2 as forming corner notches on the sheet material M which has been placed on the front work-table 7 in such a manner that a corner of it is placed between the upper and lower shearing tools 17 and 19. Also, in order to adjustably position corners of the sheet material M to form corner notches on the same, there may be provided a pair of positioning means 21 and 23 which are shown by imaginary lines in FIG. 2 and are adjustably mounted on the front work-table 7 in such a manner as to be adjustably fixed in slots 25 and 27 such as T-slots formed on the front work-table 7. Furthermore, in order to adjust the horizontal clearance between the upper and lower shearing tools 17 and 19, the front work-table 7 may be so disposed as to be horizontally adjustably moved toward and away from the ram member 5 in a conventional manner.

From the above description, it will be of course readily apparent that the upper and lower shearing tools 17 and 19 will cooperate with each other to shear and notch the sheet material M placed therebetween on the front work-table 7 when the ram member 5 is vertically lowered.

As is also seen from FIGS. 1 and 2, the notching machine 1 is further provided with a rear work-table 29 which is fixedly mounted on the frame 3 on the rear side of the ram member 5 so that a sheet material M' may be notched thereon. Also, in order to make notching operations on the rear work-table 29, the ram member 5 is provided at its rear side with a rear upper shearing tool 31, and a rear lower shearing tool 33 is mounted on the rear work-table 29 just beneath the rear upper shearing tool 31 to cooperate therewith. Of course, the rear upper and lower shearing tools 31 and 33 are disposed to notch the sheet material M' placed on the rear work-table 29 in cooperation with each other when the ram member 5 is lowered along the guide members 13 and 15. In the preferred embodiment, the rear upper and lower shearing tools 31 and 33 are so arranged as to form edge notches at the edge of the sheet material M' to be placed on the rear work-table 29, since the front upper and lower tools 17 and 19 are arranged so as to form corner notches on the sheet material M placed on the front work-table 7. Therefore, in order to adjustably position edges of the sheet material M' to form edge notches on the same, there may be provided a pair of positioning means 35 and 37 which are shown by imaginary lines in FIG. 2 and are releasably fixed in slots 39 and 41 formed on the rear work-table 29.

According to the present invention, various shapes of the rear upper and lower shearing tools 31 and 33 can be used to form desired shapes of notches on the sheet material M' to be placed on the rear work-table 29, although of course the front upper and lower shearing tools 17 and 19 can be also changed according to shapes of the sheet material M to be placed on the front work-table 7. Also, the horizontal clearance between the rear upper and lower shearing tools 31 and 33 can be adjusted according to the thickness of the sheet material M', although the clearance between the front upper and lower shearing tools 17 and 19 can be also adjusted as has been described hereinbefore.

Figure 3:
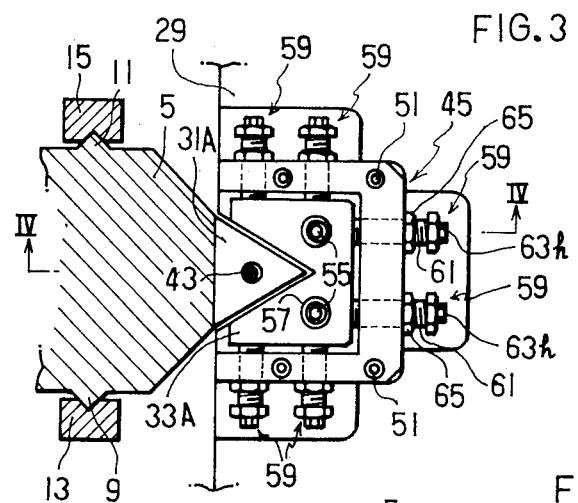
FIG. 3 is a sectional plan view showing an embodiment of a portion of the notching machine shown in FIGS. 1 and 2 in section taken along the line III/-V—III/V of FIG. 1.
Figure 4:
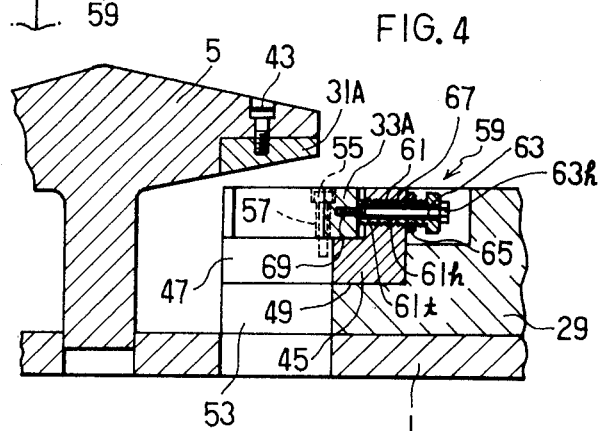
FIG. 4 is a sectional view taken along the line IV—IV of FIG. 3.

Referring to FIGS. 3 and 4, there are shown a pair of rear upper and lower shearing tools 31A and 33A which have been formed V-shaped in configuration to form V-shaped edge notches on edges of the sheet material M' placed on the rear work-table 29. The rear upper shearing tool 31A is detachably fixed to the ram member 5 on the rear side thereof by a suitable tightening means 43 such as a bolt so that it may be changed with another one according to the thickness of the sheet material M'. The rear lower shearing tool 33A is held in a tool holding means 45 mounted on the rear work-table 29 just beneath the rear upper shearing tool 31A so that it may be engaged by the rear upper shearing tool 31A when the ram member 5 is lowered. The tool holding means 45 is of a box-like frame which is provided at its bottom with a hole 47 from which slugs cut from the sheet material M' in notching operations are to be discharged, and it is put in a concavity 49 formed on the top of the rear work-table 29 and is fixed thereto by a plurality of tightening means 51 such as bolts. Also the concavity 49 in which the tool holding means 45 is put is formed at its bottom with a hole 53 which is connected with the hole 47 of the tool holding means 45 so that slugs cut from the sheet material M' may be discharged therethrough.

The rear lower shearing tool 33A is detachably and adjustably fixed in the tool holding means 45 by a plurality of tightening means 55 such as bolts which are vertically disposed to be screwed into the tool holding means 45 through vertical holes 57 which has been formed through the rear lower shearing tool 33A. The vertical holes 57 has been formed as clearance holes larger in diameter than the tightening means 55 so that the rear lower shearing tool 33A may be horizontally moved and adjusted when the tightening means 55 are loosened. Also, the rear lower shearing tool 33A is so arranged as to be adjustably held in the tool holding means 45 by a plurality of adjusting screw means 59 which are horizontally disposed at the tool holding means 45.

As best shown in FIG. 4, each of the adjusting screw means 59 for adjusting the rear lower shearing tool 33A comprises a tubular bolt members 61 having an elongate hollow 61h and formed at its outer surface with a threaded portion 61t, an adjusting bolt members 63 having a head 63h and being much smaller in diameter than the hollow 61h of the tubular bolt members 61 and loosely put therein and a locking nut members 65 engaged with the threaded portion 61t of the tubular bolt members 61. The tubular bolt members 61 is adjustably horizontally threaded from the outer side of the tool holding means 45 into one of threaded holes 67 which are horizontally formed through the tool holding means 45 in such a manner that it may be pushed into contact with the rear lower shearing tool 33A. The adjusting bolt members 63 is loosely put in the hollow 61h of the tubular bolt members 61 with its head 63h out thereof and is adjustably screwed into one of threaded holes 69 horizontally formed at the rear lower shearing tool 33A so that it may draw the lower shearing tool 33A to the end of the tubular bolt members 61 when tightened. In this arrangement, the tubular bolt members 61 and the adjusting bolt members 63 will cooperate with each other to act to hold the rear lower shearing tool 33A when the tubular bolt members 61 is kept tightened in contact with the rear lower shearing tool 33A and the adjusting bolt members 63 is tightened to draw the rear lower shearing tool 33A to the tubular bolt members 61. Also, it will be readily apparent to those skilled in the art that the locking nut members 65 will keep the tubular bolt members 61 from rotating in the threaded holes 67 when tightened.

From the above description, it will be readily understood that the horizontal clearance between the rear upper and lower shearing tools 31A and 33A can be adjusted according to the thickness of the sheet material M' by manipulating the adjusting screw means 59. In order to adjust the horizontal clearance between the rear upper and lower shearing tools 31A and 33A, firstly the tightening means 55 of the rear lower shearing tool 33A and the locking nut members 65, the adjusting bolt members 63 and the tubular members 61 of the adjusting screw means 59 are loosened and then the rear lower shearing tool 33A is horizontally moved and adjusted in the tool holding means 45 so as to obtain a desired clearance between the rear upper and lower shearing tools 31A and 33A and lastly all the loosened members are tightened again.

Figure 5:
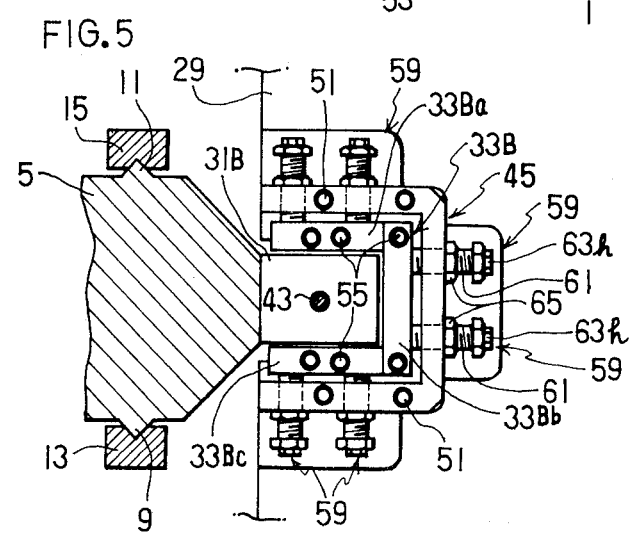
FIG. 5 is a sectional plan view showing another embodiment of the portion of the notching machine shown in FIGS. 1 and 2 in section taken along the line III/-V—III/V of FIG. 1.

Referring now to FIG. 5, there are shown another pair of rear upper and lower shearing tools 31B and 33B which have been formed more or less rectangular in configuration to form rectangular notches on edges of the sheet material M' placed on the rear work-table 29. Although the rear upper and lower shearing tools 31B and 33B shown in FIG. 5 are rectangular in shape, they are mounted in all the same manner as the rear upper and lower shearing tools 31A and 33A shown in FIGS. 3 and 4. The rear lower shearing tool 33B has been divided into three pieces 33B$a$, 33B$b$ and 33B$c$, but each of them is fixed to the tool holding means 45 by the tightening means 55 and is so arranged as to be adjusted just in the same manner as the rear lower shearing tool 33A shown in FIGS. 3 and 4.

Figure 6:
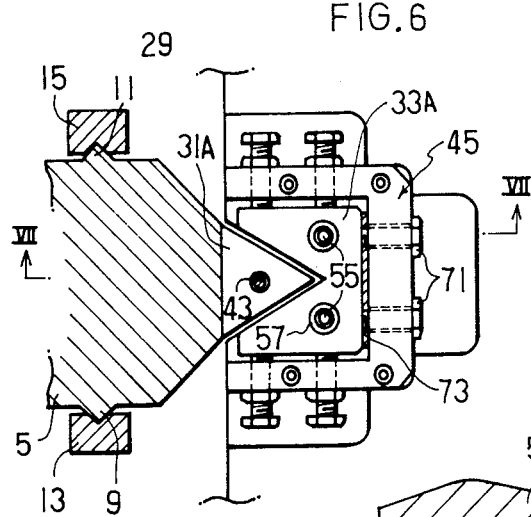
FIG. 6 is a sectional plan view showing a modified embodiment of the embodiment shown in FIGS. 3 and 4.
Figure 7:
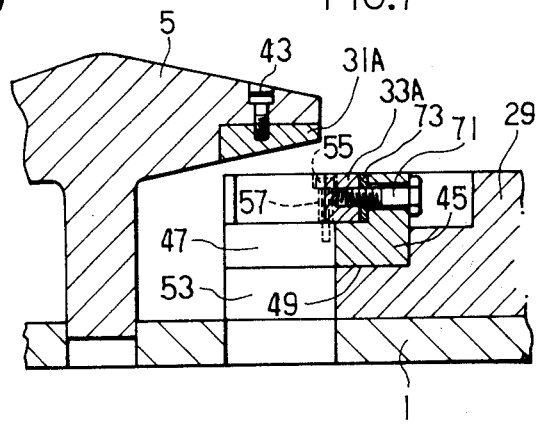
FIG. 7 is a sectional view taken along the line VII—VII of FIG. 6.
Figure 8:
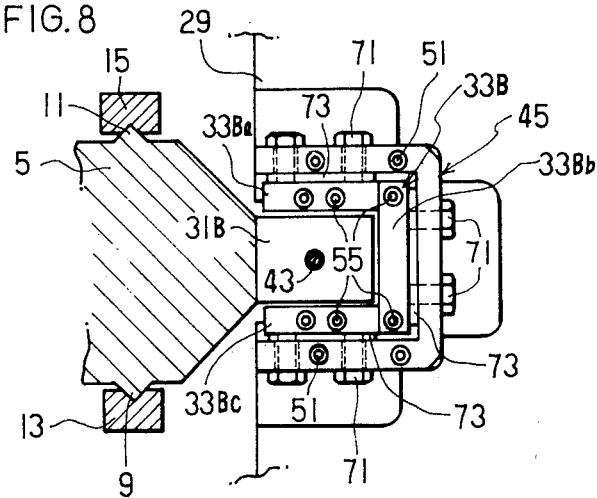
FIG. 8 is a sectional plan view showing a modified embodiment of the embodiment shown in FIG. 5.

Referring to FIGS. 6, 7 and 8, there are shown modified embodiments of the embodiments shown in FIGS. 3, 4 and 5. In these embodiments, the rear lower shearing tools 33A and 33B are held in the tool holding means 45 by a plurality of bolts 71 which are provided on the tool holding means 45 instead of the adjusting screw means 51 shown in FIGS. 3, 4 and 5, and a shim or shims 73 are inserted between the tool holding means 45 and the rear lower shearing tool 33A or 33B to adjust the horizontal clearance between the rear upper and lower shearing tools 31A or 31B and 33A or 33B.

As has been far described in the above, the notching machine 1 according to the present invention can be installed with the upper and lower shearing tools 31 and 33 of a variety of shapes to form corner notches and edge notches of various shapes on the sheet materials M and M'. Also, in the notching machine 1 according to the present invention, the horizontal clearance between the upper and lower shearing tools 31 and 33 can be easily adjusted according to the thicknesses of the sheet materials M and M' to be notched.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A notching machine comprising:

a frame;

a table being mounted on said frame;

a means for holding shearing tools being provided with said table;

a ram member being vertically movably mounted on said frame;

an upper shearing tool being provided with said ram member;

a lower shearing tool cooperating with said upper shearing tool, said lower shearing tool being divided into a plurality of pieces; and screw means for adjustably holding said lower shearing tool in said means for holding shearing tools in such a manner that horizontal clearance between said upper and lower shearing tools may be changed in lateral, forward, and backward directions independently.

* * * * *